Patented July 7, 1953

2,644,811

UNITED STATES PATENT OFFICE 2,644,811

SULFURIZATION OF OXYGENATED ALIPHATIC COMPOUNDS

Helen Sellei Beretvas, Chicago, Ill., assignor to Standard Oil Company, Chicago, Ill., a corporation of Indiana No Drawing. Application July 30, 1949, Serial No. 107,822

19 Claims. (Cl. 260—125)

This invention relates to the sulfurization of substantially saturated oxygenated aliphatic compounds, and more particularly relates to the sulfurization of a mixture of substantially saturated oxygenated aliphatic compounds, including alcohols, aldehydes, ketones, lactones, and the like, obtained in the synthesis involving the reaction of unsaturated hydrocarbons with carbon monoxide.

An object of the invention is to provide a method of sulfurizing mixtures of substantially saturated oxygenated aliphatic compounds, including alcohols, aldehydes, esters and ketones, which mixtures have a small degree of unsaturation but a Hanus iodine number of not more than about 45, to obtain stable sulfurized products of good color and high sulfur content.

Another object of the invention is to provide a method of sulfurizing a bottoms fraction of the synthesis involving reacting an olefin with carbon monoxide and hydrogen.

A still further object of the invention is to obtain substantially odorless sulfurized mixtures of substantially saturated oxygenated aliphatic compounds obtained as a bottoms fraction in the synthesis involving reacting an olefin with carbon monoxide and hydrogen.

Other objects and advantages of the present invention will become apparent from the following description thereof.

In accordance with the present invention substantially saturated oxygenated aliphatic compounds, including alcohols, aldehydes, esters and ketones, and the like, particularly mixtures thereof, and more particularly mixtures of such oxygenated compounds obtained as a bottoms fraction in the synthesis involving the reaction of an olefin or mixtures of olefins with carbon monoxide and hydrogen, with a sulfur chloride in the presence of a small amount of water in the manner hereinafter described. I have found that the materials best adapted for sulfurization according to my method not only contain oxygen but also are characterized by having a certain degree of unsaturation. The term "substantially saturated" as used herein and in the claims means an oxygenated aliphatic compound having a certain degree of unsaturation, but having a Hanus iodine number of not more than about 45. The substantially saturated oxygenated aliphatic compounds or mixtures thereof can be sulfurized as such, or in admixture with unsaturated fats and fatty acids.

The sulfurization in accordance with the present invention is accomplished by reacting the aforementioned oxygenated aliphatic compounds with 5 to 50 volume percent, and preferably 10 to 30 volume percent of a sulfur chloride in the presence of 1 to about 50 volume percent, and preferably 5 to about 20 volume percent of added water at a temperature of from about 40° F. to about 250° F., and preferably from about 120° F. to about 160° F., for a period of time from about one-quarter hour to about two hours, and preferably from about one-half hour to about one hour. In carrying out the sulfurization, I prefer to add the sulfur chloride and water simultaneously but separately to the compound to be sulfurized; however, the sulfurization can be carried out by adding the sulfur chloride to a mixture of the oxygenated aliphatic compound and water, or the oxygenated aliphatic compound may be added to the mixture of sulfur chloride and water. In the former case, the sulfur chloride should be added slowly while in the latter case, precaution should be taken to provide adequate cooling since the reaction is vigorous. The sulfurization can also be carried out by adding water to a mixture of sulfur chloride and the oxygenated compound; however, in this case the sulfurized product is usually darker than that obtained in the other variations. In the preferred order of adding the reactants the sulfur chloride addition can be completed in about 10 minutes. The sulfur chloride mentioned may be any of the usual sulfur chlorides, such as sulfur mono-chloride ($S_2Cl_2$), sulfur dichloride ($SCl_2$), or mixtures thereof.

The sulfurized product obtained in the manner described contains some so-called corrosive sulfur and chlorine, and for use wherein the presence of corrosive sulfur and chlorine is not detrimental or objectionable the product obtained in the sulfurization reaction can be used as such, after neutralization with an alkaline reagent such as an alkali metal or alkaline earth oxide, hydroxide or carbonate, for example NaOH, $Na_2CO_3$, CaO, $K_2CO_3$, etc. The alkaline reagent is preferably added in solid form, although solutions thereof can be used. The neutralized product can then be taken up in a low-boiling hydrocarbon solvent, preferably aliphatic hydrocarbon, such as hexane, naphtha, etc., separated from the hydrocarbon insoluble products and recovered by evaporation or distillation of the solvent.

If the presence of corrosive sulfur is objectionable, or detrimental to the intended use of the sulfurized product, the latter can be freed of the corrosive sulfur by subjecting the same to a so-called deactivation step. To obtain a non-corrosive product, the sulfurized product, either after neutralization as above described, or without prior neutralization, is refluxed with a solution containing about 5 percent to about 50 percent of an alkali metal sulfide, such as sodium sulfide, a low molecular weight aliphatic alcohol, such as isopropyl alcohol, ethyl alcohol, butyl alcohol, and the like, and water. The solutions are refluxed for a period of from about one hour to about five hours, and preferably for about three hours. A suitable deactivating solution is one containing about 18 grams of anhydrous sodium sulfide, 34 cubic centimeters of isopropyl alcohol, and 100 cubic centimeters of water for each 100 grams of the sulfurized product. Deactivation of a previously neutralized sulfurized product can be accomplished by refluxing the entire neutralized reaction mass with the alcoholic solution of the alkali metal sulfide without separating the neutralized hydrocarbon soluble fractions from the insoluble fractions. After refluxing for the desired period, an equal volume of a low-boiling hydrocarbon solvent such as hexane, or a low-boiling naphtha, such as a petroleum naphtha boiling below 360° F. is added, if necessary, to the refluxed solution and the mixture allowed to settle for several hours to permit stratification into two distinct layers, the upper containing the deactivated sulfurized product. The deactivated product is recovered by distilling off the hydrocarbon diluent or by other suitable means. The deactivation step also removes chlorine from the sulfurized product, the extent of dechlorination being dependent upon the amount of deactivator, i. e. Na₂S, a sulfurized product substantially free of chlorine can be obtained. The substantially saturated oxygenated aliphatic compounds sulfurized in accordance with the herein-described invention may be mixtures of substantially saturated oxygenated aliphatic compounds, such as alcohols, acids, esters, aldehydes, ketones and the like, preferably mixtures of substantially saturated oxygenated aliphatic compounds having at least 7 carbon atoms, particularly $C_7$ to $C_{18}$ oxy compounds. A suitable source of such mixtures is a bottoms fraction obtained in the synthesis involving reacting an olefin with carbon monoxide and hydrogen in the presence of a catalyst.

It has been recently discovered that oxygenated aliphatic compounds, particularly alcohols can be synthesized by reacting an olefin with carbon monoxide and hydrogen in the presence of a catalyst, such as cobalt, nickel or iron, preferably cobalt, at a temperature of 212° F. to 450° F., and under high pressures in the range of 700–10,000 pounds per square inch. The aldehydes formed as a primary product are converted by hydrogenation to alcohols. In the synthesis the oxygenated compounds formed contain one more carbon atom than is present in the starting olefin material. For example, starting with a $C_8$ olefinic material, $C_9$ oxygenated compounds such as nonyl alcohol and nonyl aldehydes are formed. To obtain the desired primary alcohol the reaction mixture at the completion of the hydrogenation stage of the reaction is distilled under proper conditions to recover an overhead comprising largely the desired alcohol and relatively small amounts of aldehyde. The bottoms fraction, or so-called bottoms, remaining after removal of the alcohol fraction, is a mixture of higher boiling alcohols, aldehydes, acids, esters, ketones, etc. The synthesis above-described is referred to in the art as the "oxo" process and the above-mentioned bottoms are accordingly referred to as "oxo" bottoms.

Analyses of a number of such bottoms fractions show them to have a Hanus iodine value of about 25–45 and to contain 10% to 20% aldehydes, 0% to 15% organic acids, 1% to 55% esters, 20% to 60% and smaller amounts of ketones, lactones, and the like. The distillation range of the "oxo" bottoms is dependent upon the olefin starting material and the conditions of operation of the process such as temperature, residence time, and catalyst concentration. For example, in the synthesis of nonyl alcohols by reacting $C_8$ olefins with carbon monoxide and hydrogen, and distilling an overhead fraction of $C_9$ alcohols together with a minor amount of non-reduced aldehyde, the resultant bottoms will have a distillation range of from about 230° F. to 510° F. at one millimeter pressure. While the entire "oxo" bottoms fractions can be sulfurized in accordance with the present invention, for certain purposes, for example, for use in extreme pressure lubricants, it is more desirable to employ the higher boiling fractions such as may be obtained by distilling the bottoms to make an overhead of approximately 50% and a bottoms fraction of approximately 50%, and sulfurizing the latter in accordance with the herein-described method. The 50% residue fraction of "oxo" bottoms will have a distillation range of from about 290° F. to about 510° F. at one millimeter pressure.

The herein-described improved method of sulfurizing substantially saturated oxygenated aliphatic compounds will be readily understood from the following examples which are given by way of illustration and are not intended as limiting the scope of the invention.

*Example I*

A bottoms fraction obtained in the process involving subjecting a $C_8$ olefin to reaction with carbon monoxide and hydrogen in the presence of a cobalt catalyst at a temperature of about 350° F. and under a pressure of about 3000 pounds per square inch was treated with 35 weight percent sulfur chloride and 40 volume percent water at a temperature of from about 77° F. to about 158° F. for a period of about 60 minutes with constant stirring. At the end of the sulfurization period the reaction product was neutralized with 15% by weight of sodium carbonate and the neutralized product taken up in hexane. The hexane soluble portion was then separated from the hexane insoluble material and the hexane removed from the former by evaporation. The product recovered had a sulfur content of 3.8%, a chlorine content of 0.6% and a true color of 92. Sulfurization in this example proceeded quite slowly and the sulfur was only loosely bound to the oxy products as evidenced by the fact that some sulfur settled out on standing.

*Example II*

"Oxo" bottoms of Example I were treated with 16 volume percent sulfur chloride and 10 volume percent water, added separately but simultaneously at a temperature of 130° F. for 60 minutes with constant stirring. The reaction mixture was then neutralized with 15 weight percent sodium carbonate, and the neutralized product taken up in hexane. The hexane soluble material was separated from the hexane insoluble material and the former freed of hexane. The recovered product had a sulfur content of 3.8%, a chlorine content of 0.63% and a true color of 92.

Example III

An "oxo" bottoms fraction containing about 10% alcohol, 6% aldehydes, 55% esters, 2% acids, and smaller amounts of ketones, lactones, etc., was distilled to give about 50% bottoms fraction, and the latter treated simultaneously with 16 volume percent sulfur chloride and 10 volume percent water, added separately, at a temperature of about 77° F. to about 113° F. for a period of about 60 minutes. At the end of the sulfurization period the reaction product was washed with water until the wash water was neutral to methyl orange. The neutral product was then taken up in hexane, and the hexane soluble portion freed of the solvent by evaporation. The product recovered had a true color of 736, a sulfur content of 8.6% and a chlorine content of 0.92%.

Example IV

A 50% bottoms fraction of "oxo" bottoms such as used in Example III was sulfurized as in Example III except that no water was used in the sulfurization. The product recovered had a true color of 1056, a sulfur content of 8.9% and a chlorine content of 0.96%.

Although mixtures of substantially oxygenated aliphatic compounds of the type herein described per se can be sulfurized in the manner above described, products which can be more readily sulfurized and which contain more stably bound sulfur are obtained by sulfurizing the substantially saturated oxygenated aliphatic compounds in admixture with unsaturated fats and/or fatty acids, or mixtures of unsaturated fats and/or fatty acids, preferably those of at least about 10 carbon atoms.

Suitable unsaturated fatty acids are acids of the oleic series ($C_nH_{2n-2}O_2$), for example, oleic acid, elaidic acid, erucic acid, etc., the acids of the linoleic series ($C_nH_{2n-4}O_2$), such as linoleic acids, the acids of the linoleic series ($C_nH_{2n-6}O_2$) such as linolenic acid, the hydroxylated unsaturated acids, such as ricinoleic acid, etc.

Mixtures of unsaturated fatty acids or compounds containing mixtures of unsaturated fatty acids, can be used, for example, linseed oil, fish oil, fish oil residue, cottonseed oil, soya bean oil, rape oil, lard, tallow, etc.

Mixtures of substantially saturated oxygenated organic compounds and from about 1% to about 75%, preferably from about 5% to 50%, unsaturated fatty acids can be sulfurized in accordance with the herein-described invention. The following examples illustrate the sulfurization of such mixtures:

Example V

A mixture of 70% "oxo" bottoms having a distillation range of about 230° F. to about 510° F. at one millimeter pressure, obtained in the synthesis of oxy compounds from $H_2$, CO and octene-1 using a cobalt catalyst and 30% linolenic acid was treated with 16 volume percent sulfur chloride and 10 volume percent water added simultaneously but separately at a temperature of about 150° F. for about 30 minutes. At the end of the sulfurization period the reaction product was neutralized with 15 weight percent sodium carbonate and taken up in hexane. The hexane-soluble portion was separated from the hexane-insoluble material and the solvent removed from the former by evaporation. The product recovered had a sulfur content of 8.6%, a chlorine content of 4.4%, and a true color of 368.

Example VI

A mixture of 70% "oxo" bottoms, of the type described in Example V, and 30% linseed oil was treated with 16 volume percent sulfur chloride, 10 volume percent water, added simultaneously but separately at a temperature of about 150° F. for a period of about 20 minutes with constant stirring. At the end of the sulfurization period 100 parts of a mineral oil were added to 100 parts of the sulfurized oil to avoid undue thickening of the product, and the product then neutralized with 15 weight percent sodium carbonate, calculated on the sulfurized oxo-linseed blend, the neutralized product taken up in hexane, and subsequently deactivated by treatment with 18 weight percent sodium sulfide. The hexane-soluble material was then separated from the hexane-insoluble material and the hexane removed from the former by evaporation. The recovered product had a sulfur content of 7.2%, a chlorine content of 0.6%, calculated on 100% sulfurized oil, and a true color of 46. This very light color was partially due to the blending with mineral oil as described above.

Example VII

A mixture of 80% "oxo" bottoms of the type described in Example V and 20% linseed oil was treated in the manner described in Example VI except no oil was added during the sulfurization process. The recovered product had a sulfur content of 5%, a chlorine content of 0.2% and a true color of 232.

Example VIII

A mixture of 99% of the 50% bottoms fraction of the "oxo" bottoms described in Example V, and 1% linolenic acid was treated with 16 volume percent sulfur chloride, 10 volume percent water, added simultaneously but separately at a temperature of about 110° F. for a period of about 25 minutes with constant stirring. At the end of the sulfurization period the reaction mixture was neutralized with 15 weight percent solid sodium carbonate, the neutralized reaction product taken up in hexane and the hexane-soluble portion recovered as described in the preceding examples. The recovered product had a sulfur content of 9.2%, a chlorine content of 0.9%, and a true color of 600. About 1.1% sulfur settled out on standing.

Example IX

A mixture of 93% "oxo" bottoms described in Example VIII and 7% linolenic acid was treated in the manner described in Example VIII. The recovered product had a sulfur content of 9.8%, a chlorine content of 1.68%, and a true color of 480. As in Example VIII some sulfur settled out on standing.

Example X

A mixture of 80% of the "oxo" bottoms of Example VIII and 20% linolenic acid was sulfurized in the manner described in Example VIII. The recovered product had a stable sulfur content of 8.7%, a chlorine content of 3.58%, and a true color of 480.

Example XI

A mixture of 80% "oxo" bottoms of Example VIII and 20% linolenic acid was sulfurized in the manner described in Example X except that no water was used in the sulfurization. The recovered product had a sulfur content of 9.28%, a chlorine content of 3.82%, and a true color of 1200.

The true color value reported herein is obtained by determining the dilution necessary to get an ASTM color between 4 to 5 by using a colorless diluent, e. g. naphtha, and calculating the true color according to the following table:

TRUE COLORS FROM ASTM COLORS

| Dilution* Ratio | ASTM Color | | | | |
|---|---|---|---|---|---|
| | 5 | 4¾ | 4½ | 4¼ | 4 |
| 1:1** | 75 | 60 | 46 | 33 | 29 |
| 1:2 | 150 | 120 | 92 | 66 | 58 |
| 1:4 | 300 | 240 | 184 | 132 | 116 |
| 1:8 | 600 | 480 | 368 | 264 | 232 |
| 1:16 | 1,200 | 960 | 736 | 528 | 464 |
| 1:32 | 2,400 | 1,920 | 1,472 | 1,056 | 928 |
| 1:64 | 4,800 | 3,840 | 2,944 | 2,112 | 1,856 |

*Sample:sample plus diluent.
**No dilution. True color equivalent of ASTM color.

The true color can be calculated by the method of dilution according to the formula:

True color=true color equivalent of ASTM color of 4 to 5 times the dilution required to give an ASTM color of 4 to 5 to the diluted product. In the above table the true color values for 1:1 dilution corresponding to ASTM colors for 4 to 5 are obtained from the chart on page 165 of "Industrial and Engineering Chemistry," February 1926.

The sulfurized products obtained in accordance with the herein-described invention are soluble in hydrocarbon oils, such as for example, natural mineral lubricating oils and synthetic hydrocarbon lubricating oils, and when compounded with such oils are effective in imparting desirable properties thereto, such as for example, extreme pressure properties. The extreme pressure properties imparted to such lubricating oils is shown by the data in the following table in which tests on the Almen machine are tabulated. These data were obtained on a blend of 90% of a mineral lubricating oil having an S. U. S. viscosity at 100° F. of from about 180 seconds, and 10% of sulfurized substantially saturated oxygenated aliphatic compounds as herein described.

TABLE

| Oil | Almen | |
|---|---|---|
| | Pass | Fail |
| Control | 4 | 6 |
| Control+10% Product of Ex. I (supra) | 10 | 12 |
| Control+10% Product of Ex. V (supra) | 30+ | 30+ |
| Control+10%* Sulfurized Product of Ex. VI (supra) | 16 | 18 |

*20% of product which was 50% sulfurized material and 50% oil was used. This is equivalent to 10% sulfurized product.

The sulfurization of unsaturated esters of aliphatic acids with a sulfur chloride in the presence of water and in the absence of added hydrogen sulfide is described and claimed in my copending application Serial No. 102,170, filed June 29, 1949. The sulfurization of unsaturated fats and fatty acids with a sulfur chloride in the presence of water and in the absence of added hydrogen sulfide is described and claimed in my copending application Serial No. 108,856, filed August 5, 1949.

While I have described in detail preferred embodiments of my invention it should be understood that the invention is not limited to any of the details herein-above set forth but includes within its scope such modifications as come within the spirit of the appended claims.

I claim:

1. The method of sulfurizing a substantially saturated oxygenated aliphatic compound having a small degree of unsaturation but having a Hanus iodine number of not more than about 45, comprising reacting said oxygenated compound with sulfur chloride, and from about 5% to about 50% by volume of water at a temperature of from about 40° F. to about 250° F. in the absence of added hydrogen sulfide.

2. The method of sulfurizing a mixture of oxygenated aliphatic compounds, said mixture having a small degree of unsaturation but having a Hanus iodine number of not more than about 45, comprising reacting said mixture with a sulfur chloride, and from about 5% to about 50% by volume of water at a temperature of from about 40° F. to about 250° F., in the absence of added hydrogen sulfide.

3. The method of sulfurizing a bottoms fraction from the synthesis involving reacting an olefin with carbon monoxide and hydrogen in the presence of a catalyst, said bottoms fraction comprising essentially a mixture of oxygenated aliphatic compounds, and distilling within the range of from about 230° F. to about 510° F. at one millimeter pressure, and having a Hanus iodine number of not more than about 45, comprising reacting said bottoms fraction with a sulfur chloride, and from about 5% to about 50% by volume of water at a temperature of from about 40° F. to about 250° F., in the absence of added hydrogen sulfide.

4. The method of sulfurizing a mixture of a substantially saturated oxygenated aliphatic compound having a small degree of unsaturation but having a Hanus iodine number of not more than about 45, and from about 1% to about 75% of an unsaturated fatty material selected from the group consisting of unsaturated fats, unsaturated fatty acids and mixtures thereof, comprising reacting said mixture with a sulfur chloride in the presence of from about 5% to about 50% by volume of water at a temperature of from about 40° F. to about 250° F., in the absence of added hydrogen sulfide.

5. The method of claim 4 in which the unsaturated fatty material is linolenic acid.

6. The method of claim 4 in which the unsaturated fatty material is linseed oil.

7. The method of claim 4 in which the substantially saturated oxygenated aliphatic compound is a bottoms fraction from the synthesis involving reacting a $C_7$ olefin with carbon monoxide and hydrogen in the presence of a catalyst, said bottoms fraction having a Hanus iodine number of not more than 45 and distilling in the range of from 230° F. to about 510° F. at one millimeter pressure.

8. The method of sulfurizing a substantially saturated oxygenated aliphatic compound having a small degree of unsaturation but having a Hanus iodine number of not more than about 45, comprising reacting said oxygenated compound with sulfur chloride and from about 5% to about 50% by volume of water at a temperature of from about 40° F. to about 250° F., in the absence of added hydrogen sulfide, and neutralizing the sulfurized product.

9. The method of claim 8 in which the neutralizing reagent is an alkali metal carbonate.

10. The method of claim 8 in which the neutralizing reagent is sodium carbonate.

11. The method of claim 8 in which the neutralizing reagent is an alkali metal sulfide.

12. The method of claim 8 in which the alkaline reagent is sodium sulfide.

13. The method of claim 8 in which the substantially saturated oxygenated aliphatic compound is a bottoms fraction from the synthesis involving reacting a $C_7$ to $C_8$ olefin with carbon monoxide and hydrogen in the presence of a catalyst, said bottoms fraction comprising essentially a mixture of oxygenated aliphatic compounds and having a Hanus iodine number of not more than about 45.

14. The method of sulfurizing a mixture of a substantially saturated oxygenated aliphatic compound having a small degree of unsaturation but having a Hanus iodine number of not more than about 45, and from about 1% to about 75% of an unsaturated fatty material selected from the group consisting of unsaturated fats, unsaturated fatty acids and mixtures thereof, comprising reacting said mixture with sulfur chloride in the presence of about 5% to about 50% by volume of water, at a temperature of from about 40° F. to about 250° F., in the absence of added hydrogen sulfide, and neutralizing the sulfurized product.

15. The method of claim 14 in which the unsaturated fatty material is a fatty acid of at least about 10 carbon atoms.

16. The method of claim 14 in which the unsaturated fatty material is linolenic acid.

17. The method of claim 14 in which the unsaturated fatty material is linseed oil.

18. The method of claim 14 in which the substantially saturated oxygenated aliphatic compound is a bottoms fraction of a synthesis involving reacting a $C_7$ to $C_{18}$ olefin with carbon monoxide and hydrogen in the presence of a catalyst, said bottoms fraction having a Hanus iodine number of not more than about 45.

19. The method of sulfurizing a mixture of an unsaturated fatty acid of at least 10 carbon atoms and a bottoms fraction from the synthesis involving reacting a $C_7$ to $C_{18}$ olefin with carbon monoxide and hydrogen in the presence of a catalyst, said bottoms fraction comprising essentially a mixture of substantially saturated oxygenated compounds, and having a Hanus iodine number of not more than about 45, comprising reacting said mixture with sulfur chloride in the presence of from about 5% to about 50% by volume of water at a temperature of from about 40° F. to about 250° F., in the absence of added hydrogen sulfide, neutralizing the sulfurized product with an alkali metal carbonate, refluxing the neutralized sulfurized product with an alcoholic solution of an alkali metal sulfide and recovering the sulfurized product by extraction with a hydrocarbon solvent.

HELEN SELLEI BERETVAS.

References Cited in the file of this patent

UNITED STATES PATENTS

| Number | Name | Date |
|---|---|---|
| 2,218,997 | Wasson | Oct. 22, 1940 |
| 2,289,438 | Knowles et al. | July 14, 1942 |
| 2,337,473 | Knowles et al. | Dec. 21, 1943 |